Oct. 7, 1958 W. A. VOGT 2,855,292
METHOD OF REFINING MOLTEN METAL WITH OXYGEN CONTAINING GAS
Filed Dec. 28, 1953
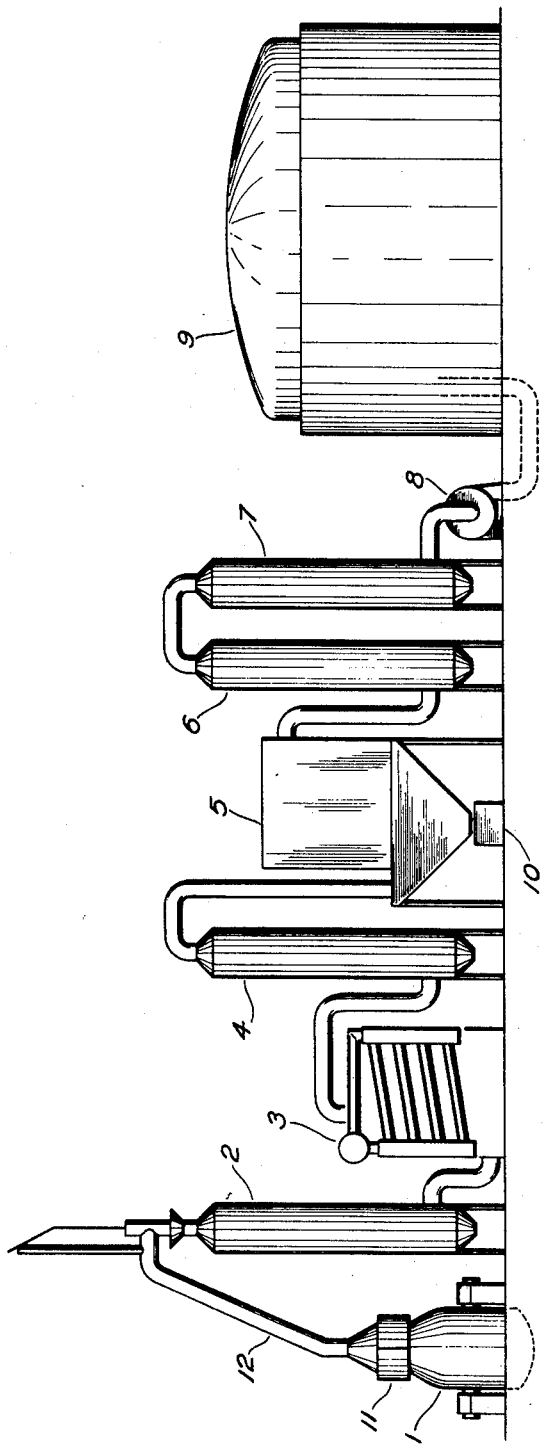
William A. Vogt
INVENTOR.
BY James E. Toomey United States Patent Office 2,855,292
Patented Oct. 7, 1958

2,855,292

METHOD OF REFINING MOLTEN METAL WITH OXYGEN CONTAINING GAS

William A. Vogt, Concord, Calif., assignor to Henry J. Kaiser Company, Oakland, Calif., a corporation of Nevada Application December 28, 1953, Serial No. 400,479

9 Claims. (Cl. 75—60)

This invention relates to a method of handling gases generated in the operation of metallurgical process; and has particular reference to the manufacture of steel in vessels or converters, such as Bessemer converters.

The Bessemer process, which has long been established in the industry, consists of charging a vessel with molten iron from a blast furnace and then blowing several thousand cubic feet of unheated atmospheric air per minute through the mass of hot metal, the air being introduced through the bottom of the converter in this process as earlier known to the art.

Large volumes of carbon monoxide are generated by the reaction of the oxygen of the air forced through the vessel as it combines with the carbon of the iron. Slag also is formed by the combination of oxygen and other impurities in the metal. The carbon monoxide is discharged from the mouth of the vessel, where upon contact with the oxygen of the surrounding air, it is further burned to carbon dioxide with the consequent liberation of greatly additional amounts of heat. Large quantities of dust laden hot gases are thus released to the surrounding atmosphere creating a condition which, not only is wasteful from a standpoint of heat loss, but also contributes in no small measure to the pollution of the air with deleterious effect upon both animal and plant life.

A later development of the Bessemer process comprises the utilization of relatively pure oxygen in place of the atmospheric air heretofore used. This method, due to the greatly higher oxygen concentration, has resulted in a number of changes being made in the process including the introduction of the oxygen into the upper end of the converter instead of being forced through the bottom of the vessel as was prior practice with atmospheric air. Carried out in an open vessel, this step in the process results in the formation of large quantities of carbon dioxide; intense heat is generated, and iron oxides in the form of fine particles of dust are entrained in the escaping gases, contributing their share to a condition which is becoming increasingly critical in highly industrialized areas.

Efforts have been made to control, to some extent, the aforementioned undesirable conditions by the use of hoods and ducts placed some distance above the discharge openings of the converters, but owing to the large volumes of gas to be handled, and also due to the fact that the flames emitted from the mouth of the vessel attain a height of the neighborhood of forty feet, such efforts have met with but little success, and that, only with the provision of dust control equipment of relatively large proportions.

It is a principal object of the present invention to provide a method whereby dust-laden gases, issuing from vessels or converters wherein molten metal is blown with an oxygen-providing gas such as air, oxygen, oxygen-enriched air or the like, are collected and their valuable components recovered. It is a particular object of the invention to provide a process for conserving the potential heat of gases produced as described. It is a further particular object of the invention to recover the dust solids content of the dust-laden gases produced as described, these solids being utilizable for a number of purposes. It is a further object of the invention to provide a method whereby the reducing gas issuing from a Bessemer converter during the blowing period can be separately recovered in a form utilizable for fuel, and the finely divided solids borne or carried by such reducing gas are also separately recovered. It is a still further object of the invention to provide a method for preventing undesired reactions of the components of dust-laden gases issuing from vessels wherein molten metal is blown as described, and to separately recover the solids and gaseous components as valuable products. Other objects and advantages of this invention will be observed from the description below.

According to the present invention, the dust-laden gases issuing from a vessel or converter wherein molten metal, especially ferrous metal such as iron or steel, is blown with an oxygen-providing gas, are withdrawn from the blowing zone out of contact with an oxidizing gas, especially air, are immediately cooled to prevent reaction between the solid and gaseous components, and the solid component is then separated from the gas. The oxygen-providing gas is usually air or oxygen, but oxygen-enriched air or the like can also be employed. The solids component of the dust-laden gases consists essentially of very finely divided oxide of the metal being refined or treated, although it can also contain minor amounts of finely divided oxides of other metals, e. g. alloying elements, present. The gaseous component consists essentially of carbon monoxide, but it can contain a minor amount of carbon dioxide and of other gases, the carbon oxides having been formed by reaction of the oxygen-providing gas with the carbon contained in the metal, especially ferrous metal. The oxygen also reacts with other impurities in the metal such as sulfur, phosphorous or other materials which form thereby oxides gaseous at the temperature of operation. The invention will be particularly described below with reference to the Bessemer process.

In the Bessemer process, blowing molten iron or steel in the converter with a stream of oxygen-providing gas, generally at high velocity, reduces the carbon content by forming predominantly carbon monoxide with a minor amount of carbon dioxide. There is also formed a large amount of iron oxide, which is in the form of very small particles, predominantly less than 0.5 micron in diameter. The gases generated in the converter carry off the small particles of iron oxide in the form of a fume, and the whole is at a very high temperature. Small amounts of the oxides of metals present in the iron as impurities or as alloying elements may also be produced and carried off, in similar manner and like particle size. A large volume of gas is produced, and this is due in part to the increase in volume caused by conversion of oxygen to carbon oxides, but also in large part to the very high temperature of the issuing gases, which is usually at least about 3000° F. This gas in a typical operation contains about 85% CO, about 10% $CO_2$ and about 5% other gases, by volume.

The oxygen-providing gas employed in the present process can be air, oxygen-enriched air, or oxygen. Oxygen is a particularly desirable gas because the product contains a minimum of gases other than carbon monoxide; and the recovery of carbon monoxide is especially desirable because of its high fuel value.

The gases or fumes are cooled rapidly after leaving the converter to reduce the temperature thereof and thereby prevent reaction between the reducing gas and the metal oxide. The carbon monoxide reduces the iron oxide, for instance, forming carbon dioxide and the metal.

Such a result is undesirable because the fuel value of the gas is effectively lost, and because further heat is generated where it is not desired. This reduction is prevented by rapidly cooling the gas mixture, preferably to below 2500° F. The cooling is effected rapidly, and one preferred method is to shock chill by spraying a cold liquid, such as water, into the fume. Another effect of this cooling step is to reduce the volume of the gas and thereby increase the ratio of solids to gas, or the concentration of solids in the gas, which facilitates filtration and separate recovery of the gaseous and solid components.

The gases or fumes, after being rapidly cooled to the point where the undesired reduction reaction does not occur, are then further cooled if desired, and the solids are separated from the gaseous component. In an operation where the fumes are shock chilled directly to low temperatures, they can be filtered directly, as for instance through filter bags of known type, which can be made of cloth such as closely woven cotton, wool or nylon or other fiber. Alternatively, since the gases contain considerable sensible heat when cooled only to about 2500° F., they can in such instance then be passed through a waste heat boiler or other heat exchanger to recover or utilize the remaining sensible heat. It is preferred in practice, however, to shock chill to not over about 600° F., then to cool to about 275° F. and to filter through bags as described above. A major portion of the dust load is recovered by such filtration, but a small amount of very fine solids particles is still carried by the gas and it contains considerable water vapor. This gas is then, therefore, if desired, passed through a washing or scrubbing tower, the temperature thereof reduced to below the dew point and the gases thus further purified and freed of residual dust particles and of at least a portion of the water vapor. The dust-laden gases can alternatively also be filtered through rigid, porous filters, such as Alundum or carbon filters and in this instance can be filtered at rather high tempertures. The dusts can alternatively be separated from the gases by precipitators, such as Cottrell precipitators, or by other means.

It is an advantage of the present invention that withdrawal out of contact with air, of the dust-laden gases from the zone wherein blowing occurs enables definite control of the amount of oxygen-providing gas, especially oxygen, which is introduced into the blowing zone, and limits it to that quantity which is required for the refining process. Under these controlled conditions, practically all of the gas evolved is in the form of carbon monoxide, having a total volume approximately one-fifth of that of the gases as finally generated in a system open to air, such as known to the prior art, wherein all carbon had been finally burned to carbon dioxide, with consequent release of additional heat and the formation of additional volumes of gas due to the introduction of atmospheric air with its large nitrogen content. Other advantages may also be mentioned. By preventing the CO gases from burning to $CO_2$ the temperatures are held within manageable range, and the potential heat content is retained for future use. Also, the volumes of the gases are reduced to a minimum, with consequent reduction in the size and cost of the dust controlling, and gas conditioning facilities. The sensible heat content of the gases can be utilized in a waste heat boiler, and valuable by-products in the form of iron oxides are recovered. The iron oxides recovered can be recycled to the reduction process to produce iron, or they can be utilized by the paint industry, etc.

This method of this invention will now be more specifically described with reference to one embodiment thereof, as shown below.

The annexed drawing sets forth in schematic form a perspective of one installation suitable for practicing an embodiment of this invention.

Referring to the drawing, a steel making vessel 1 of the Bessemer type is indicated thereon, in the upright or blowing position. A sealing member 11, in the form of a ring, encircles the upper or discharge end of the vessel 1 in clamping relationship and serves to confine the gases emitted by the vessel and direct their movement to a duct 12 communicating with a gas cooling and conditioning tower 2. The sealing member 11 is the subject of my copending application Serial No. 400,480, filed December 28, 1953.

The gases entering the tower 2 are at a temperature of approximately 3000° F. and are dust laden with iron oxides as a result of the vessel blowing operation. It is the purpose of the conditioning or cooling tower 2 to rapidly lower the temperature of the gases to a point, namely not over 2500° F., where no reactions of the iron oxides will take place with the CO gas. Suitably, the gases are rapidly cooled in this zone by introduction of a water spray in intimate contact therewith. The gases are then conducted to waste heat boiler 3.

In their passage through the waste heat boiler, the gases give up a relatively large amount of the sensible heat which would otherwise be lost to the surrounding atmosphere, and leave the boiler at a temperature in the neighborhood of 600° F. It is the ultimate purpose of the present system to store the carbon monoxide gas for use as a fuel, however, in its condition as it leaves the boiler, it is still dust laden, has a high moisture content, and must be further cooled before filtering.

In a preferred operation, the hot gases issuing from the blowing zone are shock-chilled, after passing through sealing member 11, for instance by introduction of a water spray into the gases, and are then passed directly to temperature control tower, or cooling zone, 4, where they are further cooled in any desired manner.

A temperature control tower 4 is provided for the reception of the gases leaving the boiler 3 and at this stage their temperature is further reduced to a level of approximately 275° F., they then pass therethrough to a filter 5 where the bulk of the suspended particles of iron oxide dust are removed. Leaving the filter, the gases still retain traces of the finer particles of dust and are in a relatively humid condition. The filtered gases are therefore passed through a washing tower or scrubber 6 to lower the temperature of the gases below their dew point and thus precipitate the fine particles of dust that have been carried along to this stage.

Final conditioning of the gas takes place in a drying tower 7, where entrained moisture is removed, and, under the action of an induced draft fan 8, the gases are discharged into a gasometer or storage tank 9, for future use as fuel.

A pug mill 10 has been indicated below the filter unit 5; provision can also be made at the base of all towers for the handling of solid matters precipitated, filtered and collected at these various points.

Arrangements can also be made to furnish fuel, such as gas from the gasometer 9, to maintain a head of steam in the waste heat boiler, where employed, during periods between converter blowing. In cases of installations comprising a plurality of vessels, the operation of the individual converters can be so synchronized as to permit a continuous flow of gases through the vessel.

It should be understood that the drawing is in the form of an elementary diagram and that the elements delineated thereon are for the purposes of illustration only, and are in no way to be considered as restricting the scope of the system in any of its various steps. For instance the filter indicated is in the form of a bag filter.

The specific description is for the purpose of illustration, and variations and modifications can be made therein, within the invention.

I claim:

1. In a method of refining molten metal by blowing with an oxygen-containing gas wherein the refining reactions develop carbon monoxide-containing gases having a temperature of at least about 3000° F., and a metal oxide-containing dust is suspended in said gases issuing from the refining zone, said dust at the existing temperatures being reactive with the carbon monoxide, the method of preserving the fuel value of said gases and preventing said reaction, which comprises maintaining the dust-containing gases issuing from said refining zone out of contact with the atmosphere to prevent burning of the carbon monoxide to carbon dioxide, rapidly cooling said dust-containing gases in a separate zone to temperatures of not over about 2500° F. at which temperatures the reaction of the carbon monoxide and dust does not occur, and thereafter separately recovering the metallic oxide-containing dust and the carbon monoxide-containing gases.

2. A process according to claim 1 in which the molten metal is ferrous metal, and the oxygen-containing gas is substantially pure oxygen.

3. A process according to claim 1 in which said dust-laden gases after rapid cooling to not over 2500° F. are further cooled to not over 600° F. by indirect heat exchange to remove a portion of the sensible heat therefrom in a waste heat boiler.

4. A process according to claim 1 in which the dust-laden gases are shock chilled to a temperature not over 600° F. by direct contact with water.

5. A process according to claim 1 in which said cooled dust-laden gases are filtered to separately recover said metallic oxide-containing dust and said carbon monoxide-containing component.

6. In a process for the refining of molten ferrous metal by surface blowing with substantially pure oxygen gas wherein the off gases produced by the refining reactions have a temperature of at least about 3000° F. and consist essentially of carbon monoxide, iron oxide-containing dust is suspended in said off gases, and said iron oxide-containing dust is reactive with said carbon monoxide at the said temperatures developed by the refining reactions, the method of recovering the suspended iron oxide while maintaining the fuel value of the carbon monoxide gas and preventing said reaction, which comprises collecting said dust-laden off gases out of contact with the atmosphere to prevent oxidation of the carbon monoxide, shock chilling said gases in a separate zone to a temperature of not over about 2500° F. at which reaction between the iron oxide and carbon monoxide does not occur, further cooling said dust-laden gases to not over 275° F., and thereafter filtering said cooled gases to separate the iron oxide-containing dust from said carbon monoxide-containing gas.

7. A process according to claim 6 in which the iron oxide-containing dust is shock chilled to not over 600° F. by direct contact with water spray.

8. A process according to claim 6 in which the iron oxide dust-containing gases after being rapidly cooled to about 2500° F. are thereafter further cooled to not over 600° F. to recover a portion of the sensible heat therein by indirect heat exchange in a waste heat boiler.

9. A process according to claim 6 in which the filtered carbon monoxide-containing gases are washed to remove residual dust and thereafter dried.

References Cited in the file of this patent

UNITED STATES PATENTS

| | | |
|---|---|---|
| 1,505,281 | Nagelvoort | Aug. 19, 1924 |
| 1,779,282 | Louis | Oct. 21, 1930 |
| 1,780,833 | McGurty | Nov. 4, 1930 |
| 1,896,178 | Kuzell | Feb. 7, 1933 |
| 1,912,381 | Meston | June 6, 1933 |
| 2,368,828 | Hanson et al. | Feb. 6, 1945 |
| 2,584,151 | Morrison | Feb. 5, 1952 |
| 2,675,891 | Frey | Apr. 20, 1954 |
| 2,677,439 | Hedburg | May 4, 1954 |
| 2,681,121 | Richardson | June 15, 1954 |